United States Patent [19]
Ohsawa et al.

[11] Patent Number: 5,907,226
[45] Date of Patent: May 25, 1999

[54] DRIVE CONTROL APPARATUS FOR BRUSHLESS MOTOR

[75] Inventors: Hiroshi Ohsawa; Shinichi Ohi; Kzuyoshi Horiuchi; Kouji Ando, all of Konan, Japan

[73] Assignee: Zexel Corporation, Tokyo, Japan

[21] Appl. No.: 09/018,070

[22] Filed: Feb. 3, 1998

[30] Foreign Application Priority Data

Feb. 4, 1997 [JP] Japan .................................. 9-035479

[51] Int. Cl.⁶ .......................................................... H02P 6/10
[52] U.S. Cl. ............................ 318/439; 318/254; 318/461
[58] Field of Search .................................... 318/138, 254, 318/439, 448, 452, 456, 461

[56] References Cited

U.S. PATENT DOCUMENTS

| | | | |
|---|---|---|---|
| 3,863,118 | 1/1975 | Lander et al. | 318/685 |
| 4,720,663 | 1/1988 | Welch et al. | 318/254 X |
| 4,874,993 | 10/1989 | Tanaka et al. | 318/254 |
| 5,019,756 | 5/1991 | Schwarz | 318/254 |
| 5,206,567 | 4/1993 | Sakurai et al. | 318/254 |
| 5,233,275 | 8/1993 | Danino | 318/138 |
| 5,319,289 | 6/1994 | Austin et al. | 318/138 |
| 5,717,301 | 2/1998 | Griebhammer et al. | 318/286 |

*Primary Examiner*—Bentsu Ro
*Attorney, Agent, or Firm*—Wenderoth, Lind & Ponack, L.L.P.

[57] ABSTRACT

An object of preventing a reduction in the output efficiency of a motor in the high speed rotation range and reducing the noise of the motor in the low speed rotation range is to be achieved. Since, if a signal that corresponds to the rotation rate has a value equal to or smaller than a specific value, the timing with which a switch performs switching is retarded relative to the timing used when the signal corresponding to the rotation rate has a value larger than the specific value, once the operation shifts to the low speed rotation range, the switching timing is retarded to shift from the setting that gives priority to efficiency, to the setting for achieving noise reduction as long as the switching timing is set in advance so that an optimal output efficiency is achieved in the high speed rotation range.

20 Claims, 6 Drawing Sheets

DRIVE CONTROL APPARATUS FOR BRUSHLESS MOTOR

BACKGROUND OF THE INVENTION

The present invention relates to a drive control apparatus for a brushless motor that controls the timing with which current is supplied to exciting coils based upon signals provided by Hall elements that detect the position of a rotor.

A brushless motor in the prior art comprises a rotor provided with permanent magnets, a stator provided with exciting coils wound around it for imparting a rotating magnetic field to the rotor, Hall elements that detect the position of the rotor and switching elements constituted of FETs or the like that switch the exciting coils to which electric current is supplied as disclosed in, for instance, Japanese Unexamined Patent Publication No. S 60-204286 and Japanese Unexamined Patent Publication No. H 5-91789. The timing of switching performed by the switching elements, i.e. the timing with which power is supplied to the exciting coils, is controlled based upon output signals from the Hall elements However, in the structure described above, if the timing with which power is supplied to the exciting coils is set in advance with the output efficiency of the motor as a primary factor, while no significant problems arise in the high speed rotation range, there is a problem in that, the noise of the motor in the low speed rotation range increases. If, on the other hand, the power supply timing is set with priority given to reducing the motor noise, while no significant problem arises in the low speed rotation range, there is a problem in that the output of the motor becomes insufficient in the high speed rotation range, when a large output is required.

Generally speaking, it is desirable to give priority to noise reduction in the low speed rotation range even though it somewhat reduces the output efficiency of the motor, since the need for driving the motor is not so stringent in this range, whereas it is desirable to give priority to achieving a high degree of output efficiency for the motor over a reduction in the noise in the high speed rotation range, since the need for driving the motor is acute in this range.

SUMMARY OF THE INVENTION

An object of the present invention is to provide a drive control apparatus for a brushless motor with which a reduction in the output efficiency of the motor is prevented in the high speed rotation range and a reduction in motor noise can be achieved in the low speed rotation range.

The inventors of the present invention have conducted focused research into structures that achieve the object described above based upon the observation that noise is reduced when the timing with which power is supplied to the exciting coils is retarded, whereas the noise of the motor increases as the power supply timing is advanced, which has culminated in the present invention.

Namely, the drive control apparatus for a brushless motor according to the present invention comprises a rotor provided with permanent magnets, a stator provided with exciting coils wound around it for generating a rotating magnetic field to cause the rotor to rotate, Hall elements that detect the position of the rotor, a means for switching that switches among the exciting coils to which current is supplied, a means for timing control that controls the timing with which the means for switching performs switching based upon output signals from the Hall elements, a means for decision making that makes a decision as to whether or not the value of a signal corresponding to the rotation rate is smaller than a specific value and a means for timing change that retards the timing with which the means for switching performs switching when it is decided by the means for decision making that the signal corresponding to the rotation rate has a value smaller than the specific value compared to the timing that is used when it is decided that the signal corresponding to the rotation rate has a value larger than the specific value.

As a result, since, if the signal corresponding to the rotation rate has a value equal to or smaller than the specific value, the timing with which the means for switching performs switching is retarded relative to the timing used when the signal corresponding to the rotation rate has a value larger than the specific value, the switching timing is retarded. Once the operation enters the low speed rotation range the operation shifts from the setting that gives priority to output efficiency to the setting for achieving noise reduction, as long as the switching timing is first set at the means for switching in such a manner that an optimal output efficiency is achieved in the high speed rotation range. Thus, full output is achieved in the high speed rotation range and, while the output efficiency is slightly degraded from its optimal state in the low speed rotation range, a reduction in noise can be achieved.

The timing with which the means for switching performs switching may be changed either continuously or in steps, in correspondence to changes in the signal corresponding to the rotation rate. If the timing is to be changed in steps, it may be changed over two steps, or it may be changed in three or more steps in order to perform finer control so that an optimal balance between output efficiency and noise is achieved.

For instance, if the switching timing is to be changed in three steps, a structure may be adopted in which a first decision-making value and a second decision-making value that is smaller than the first decision-making value are provided at the means for decision making, the timing with which the means for switching performs switching is not retarded at all if the signal corresponding to the rotation rate has a value larger than the first decision-making value, the timing with which the means for switching performs switching is retarded by a first quantity if the signal corresponding to the rotation rate has a value between the first decision-making value and the second decisionmaking value, and the timing with which the means for switching performs switching is retarded by a second quantity which is larger than the first quantity if the signal corresponding to the rotation rate has a value smaller than the second decision-making value.

In the structure described above, the switching timing may be retarded by delaying the output signals from the Hall elements at an integrating circuit. Alternatively, the switching timing may be retarded by inputting the signal corresponding to the rotation rate to a microcomputer, making a decision as to whether or not the signal corresponding to the rotation rate has a value smaller than a specific value by using a program that is provided in advance, calculating the delay for the output signal from the Hall elements based upon the results of the decision making and, when it is decided that the signal corresponding to the rotation rate has a value smaller than the specific value, setting the quantity of delay to be applied larger than the quantity of delay to be applied when the signal is determined to have a value larger than the specific value.

In addition, a setting signal for setting the rotation rate or an output signal from a means for detection that detects the rotor rotation rate may be used as the signal corresponding to the rotation rate.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate a preferred embodiment. In the drawings.

DETAILED DESCRIPTION OF THE PREFERRED EMBODIMENT

The following is an explanation of the embodiment of the present invention in reference to the drawings.

Figure 1:
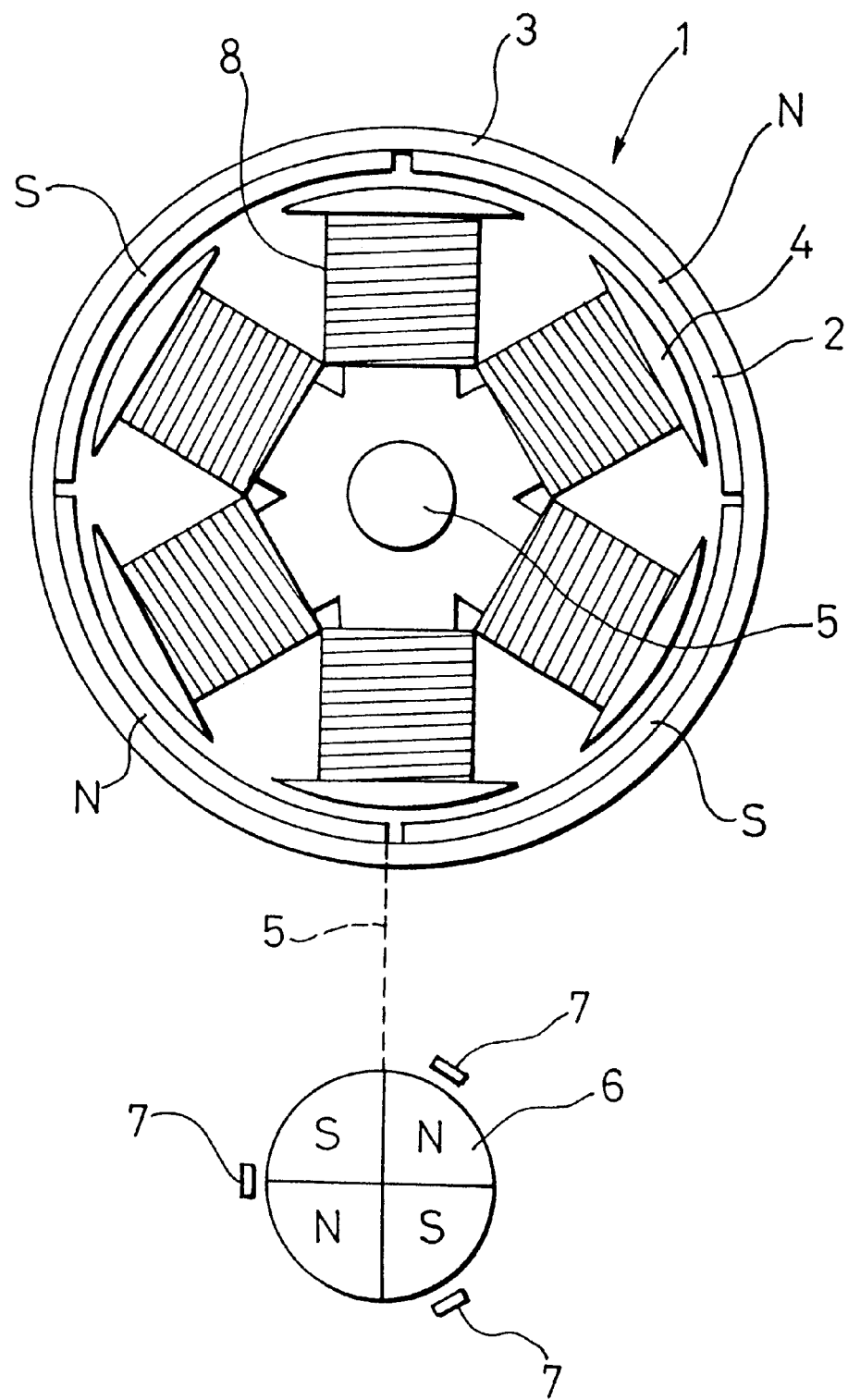
FIG. 1 is a schematic block diagram of the brushless motor in an embodiment of the present invention.

FIG. 1 shows a three-phase brushless motor 1 that is controlled by the control apparatus for a brushless motor according to the present invention. The brushless motor 1 is provided with a rotor 3 having permanent magnets 2 and a stator 4 that generates a rotating magnetic field for the rotor 3, with the N poles and the S poles of the permanent magnets 2 positioned alternately at the internal circumferential surface of the rotor 3 at positions that face opposite the external circumferential surface of the stator 4 along the direction of the rotation of the rotor 3. In addition at the front end of a rotating shaft 5 which is secured to the rotor 3, rotor magnets 6 for detecting the position of the rotor 3 are secured and Hall elements 7 for detecting the changes in the magnetic pole of the rotor magnets 6 are provided in the vicinity of the rotor magnets 6. Exciting coils 8 that are wound around the individual arms of the stator 4 comprise three exciting coils U, V and W and in this embodiment, the three exciting coils U, V and W are delta-connected. It is to be noted that the exciting coils U, V and W may instead be star-connected.

Figure 2:
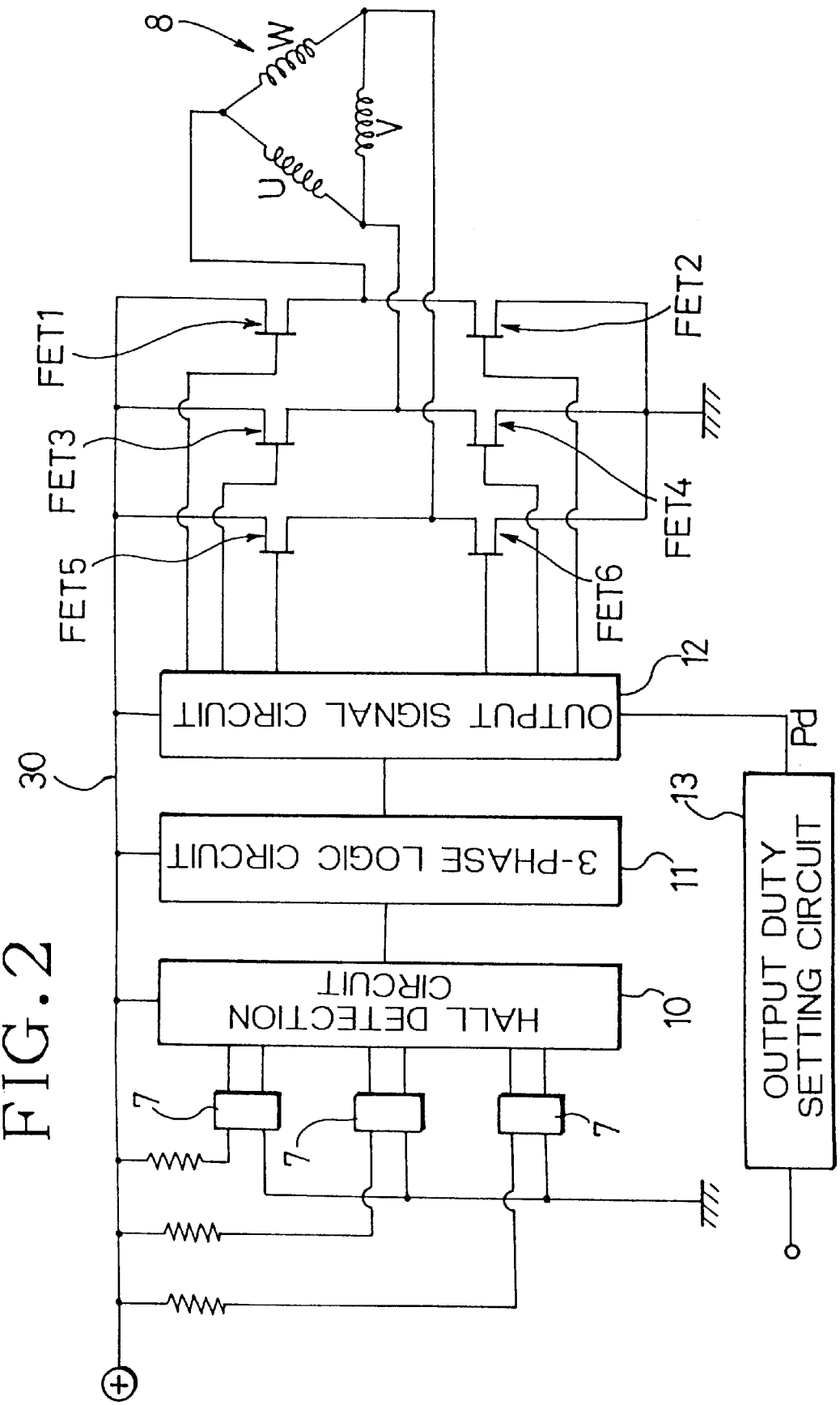
FIG. 2 is an electric circuit diagram illustrating a portion of the brushless motor control apparatus in the embodiment of the present invention.
Figure 3:
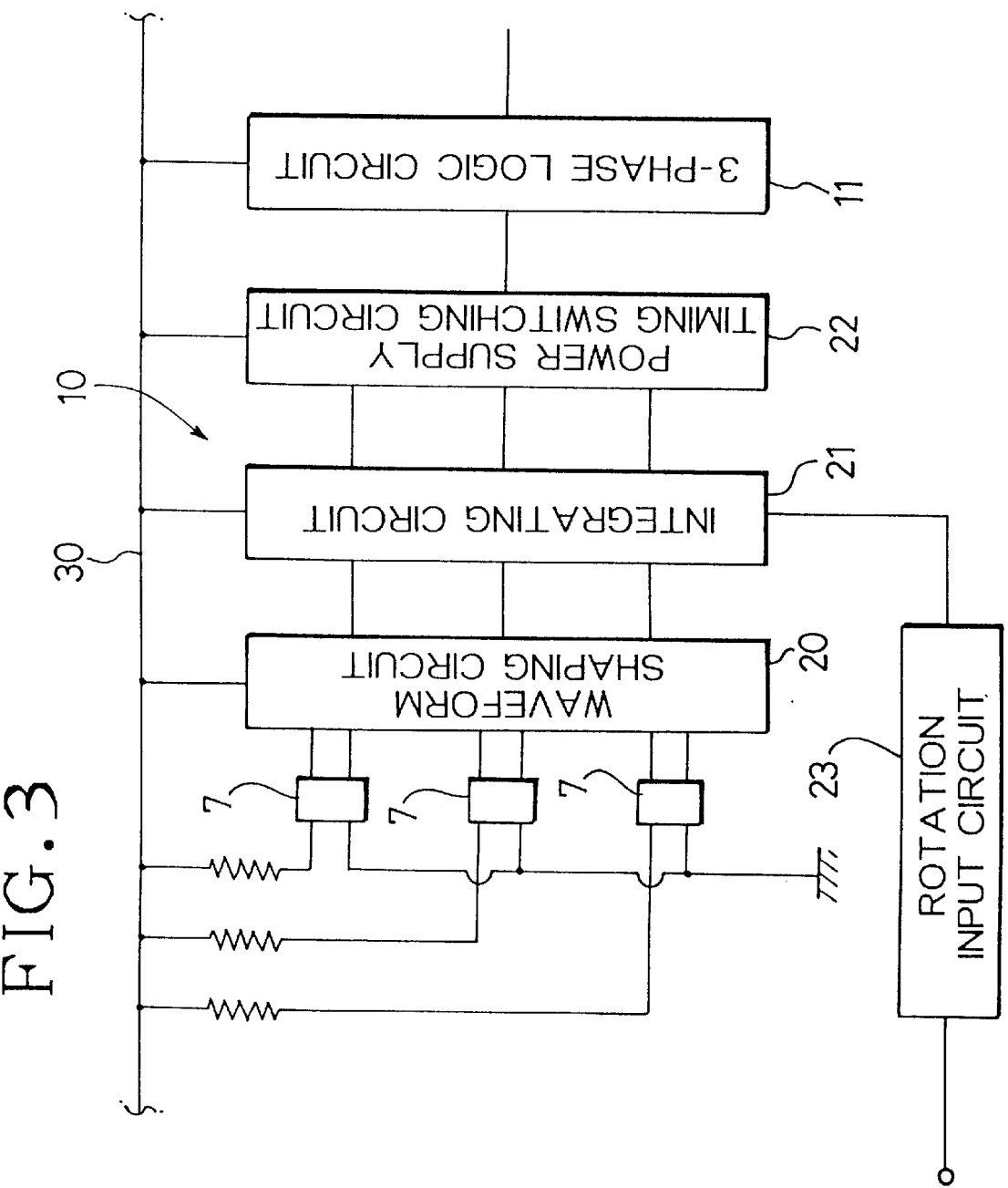
FIG. 3 illustrates the structure of the Hall element detection circuit.

The control apparatus that controls the brushless motor I constructed as described above may be, for instance, as shown in FIG. 2, comprising a Hall detection circuit 10 that detects signals from the Hall elements 7, a three-phase logic circuit 11 that sets the order in which power is supplied to the exciting coils U, V and W based upon the signal from the Hall detection circuit 10 and an output signal circuit 12 that controls a means for switching that switches the direction in which power is supplied to the exciting coils U, V and W using a power supply timing signal from the three-phase logic circuit 11 and an output duty signal Pd from an output duty setting circuit 13 which is to be detailed below. The means for switching is constituted by positioning in parallel three sets of field effect transistors between a source line 30 connected to a means for power supply such as a battery and the ground, each set comprising two field effect transistors connected in series between the source line 30 and the ground. Each of the terminals of the delta-connected exciting coils U, V and W is connected between the two field effect transistors in each set that are connected in series (between FETs 1 and 2, between FETs 3 and 4, and between FETs 5 and 6).

The Hall detection circuit 10 comprises a waveform shaping circuit 20 that shapes the detection pulse from the Hall elements 7 into a rectangular pulse, an integrating circuit 21 that applies a delay selected in correspondence to the rotation rate to the rectangular pulse thus shaped by the waveform shaping circuit and a power supply timing switching circuit 22 that outputs a pulse for determining the power supply timing based upon the detection pulse that has been delayed by the integrating circuit 21.

Figure 4:
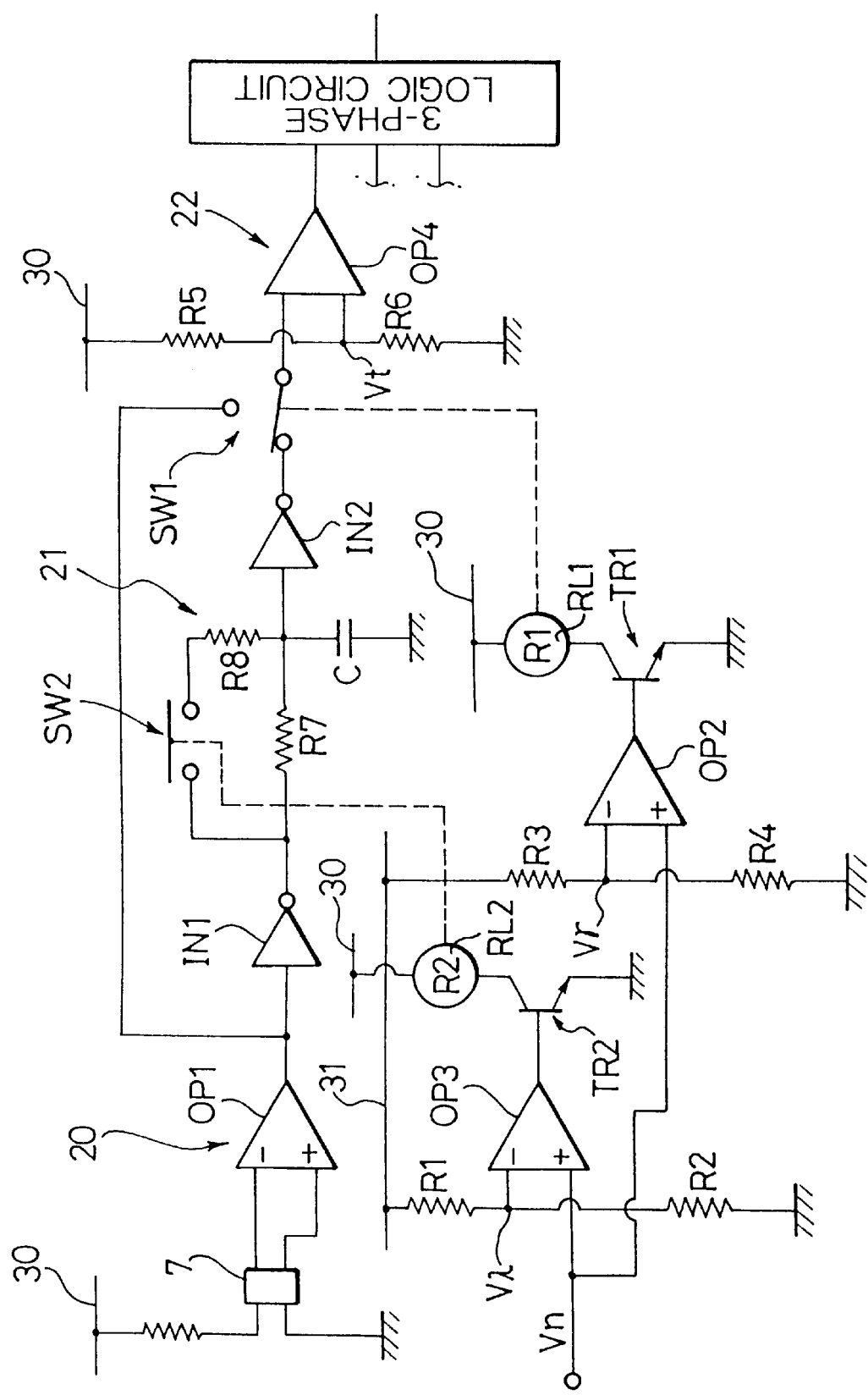
FIG. 4 is an electric circuit diagram of the Hall element detection circuit.
Figure 5:
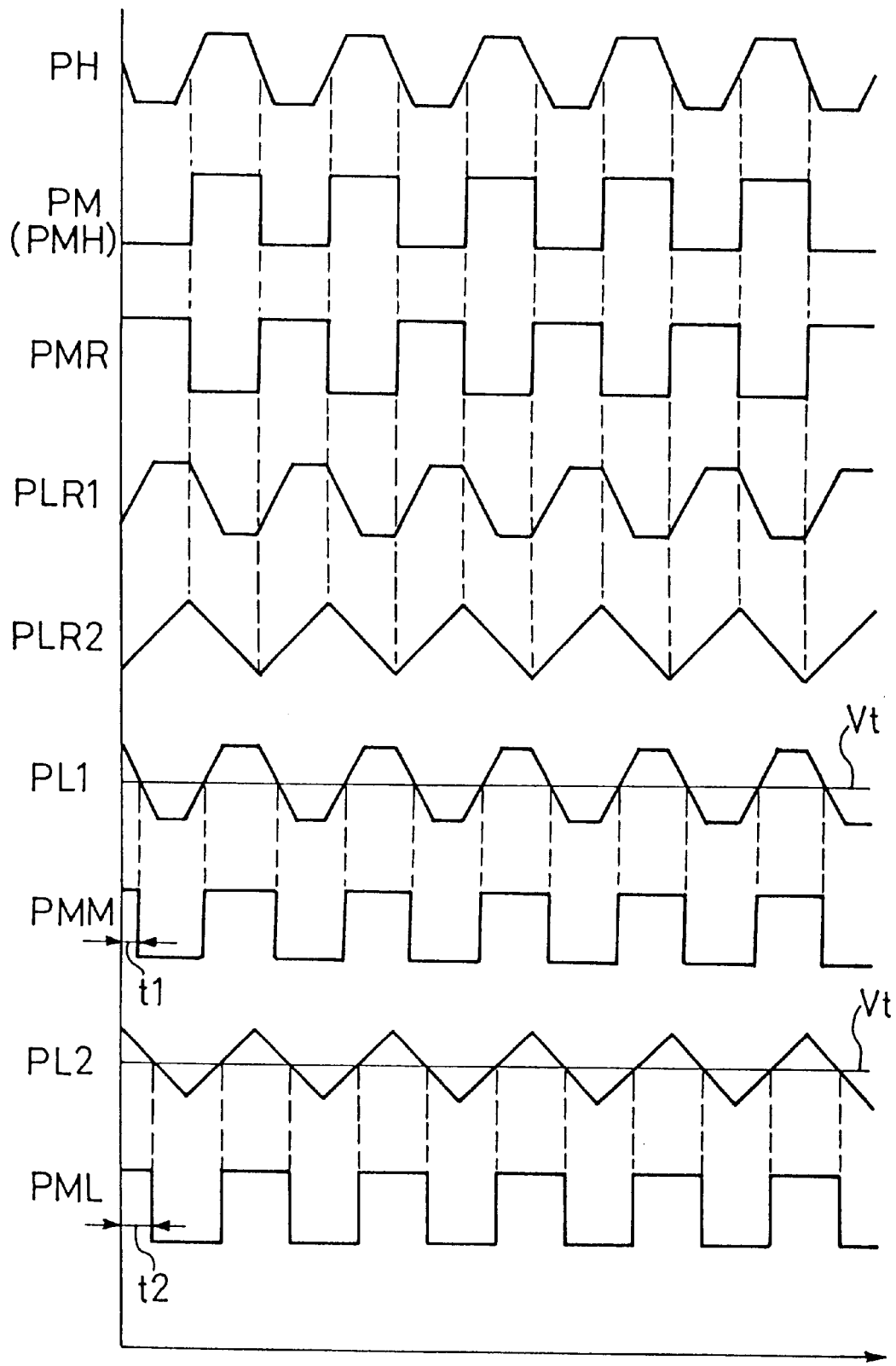
FIG. 5 is a timing chart that presents the output pulses at each stage.

To describe these circuits in more detail in reference to the electric circuit diagram in FIG. 4, a voltage supplied to the Hall elements 7 from the source line 30 fluctuates as the poles of the rotor magnets 6 approach and then move away, and a detection pulse indicated as PH in FIG. 5 is output to an operational amplifier OP1. This operational amplifier OP1, which functions as a buffer, shapes the waveform of the detection pulse PH that has been input and outputs the rectangular detection pulse PM shown in FIG. 5.

In addition, the value of an input setting voltage Vn, which is in proportion to a rotation rate setting input N, is compared to a first reference voltage Vλ that is achieved by dividing a constant voltage Vs at a constant voltage line 31 with resistors R1 and R2 and a second reference voltage Vγ(Vγ>Vλ) that is achieved by dividing a constant voltage Vs at a constant voltage line 31 with resistors R3 and R4 at operational amplifiers OP3 and OP2 respectively, to make a decision as to the rotating speed achieved by the rotation rate setting input N, i.e., whether it is high speed, medium speed or low speed.

Since the input setting voltage Vn is larger than the first reference voltage Vλ and the second reference voltage Vγ if the rotation rate setting input N is high, outputs are generated at the operational amplifier OP2 and the operational amplifier OP3 to set transistors TR1 and TR2 in a continuous state. With this, an electric current is made to run through relays RL1 and RL2 to throw the switches SW1 and SW2, and the switch SW1 shifts to the side where an inverter IN2 is bypassed from an inverter IN1, whereas the switch SW2 closes the path through which a resistor R7 is bypassed. Thus, the rectangular detection pulse PM is input to a non-inversion input terminal of an operational amplifier OP4, and this rectangular detection pulse PM is set as a switching selector signal PMH for high speed operation. Because of this, the rectangular detection pulse PM achieved by shaping the detection pulse detected at the Hall elements 7 is directly output as an output timing signal to the three-phase logic circuit 11 when high speed rotation is set.

In addition, since the input setting voltage Vn is between the first reference voltage Vλ and the second reference voltage Vγ, when the rotation rate setting input N is set at medium speed, no output is performed at the operational amplifier OP2 and an output is performed only at the operational amplifier OP3. Thus, the transistor TR1 does not enter a continuous state and only the transistor TR2 becomes continuous to set the relay RL1 in an off state and to turn on the relay RL2. The switch SW1 connects the line extending from the inverter IN1 to the inverter IN2 with the non-inversion input terminal of the operational amplifier OP4 and the switch SW2 closes the line that bypasses the resistor R7.

With this, the rectangular detection pulse PM output by the operational amplifier OP1 is inverted by the inverter IN1 to become an inverted rectangular detection pulse PMR. Since this inverted rectangular detection pulse PMR repeats charging / discharging a capacitor C via the parallel configuration constituted of the switch SW2, the resistor R7 and a resistor R8, a specific delay (a first delay) is applied to the inverted rectangular detection pulse PMR, which is then input to the inverter IN2 as a first delay pulse indicated as PLR1 in FIG. 5. Then, the first delay pulse PLR1 is inverted to become a timing setting signal PL1 for medium speed operation to constitute the output of the inverter IN2 which is then input to the non-inversion input terminal of the operational amplifier OP4.

At the operational amplifier OP4, the timing setting signal PL1 for medium speed operation is compared with a third reference voltage Vt input to the inversion input terminal of the operational amplifier OP4, and is output to the three-phase logic circuit 11 as a timing switching signal PMM for medium speed operation which is delayed by t1 from the timing switching signal PMH for high speed operation.

In addition, since the input setting voltage Vn has a value lower than those of both the first reference voltage V$\lambda$ and the second reference voltage V$\gamma$, when the rotation rate setting input N is set at low speed, the outputs at both the operational amplifier OP2 and the operational amplifier OP3 are turned off. With this, both the transistor TR1 and the transistor TR2 are set in a non-continuous state, turning off the relay RL1 and the relay RL2. The switch SW1 thus connects the line extending from the inverter IN1 to the inverter IN2 with the non-inversion input terminal of the operational amplifier OP4, whereas the switch SW2 closes the line that bypasses the resistor R7.

Thus, the rectangular detection pulse PM output by the operational amplifier OP1 is inverted by the inverter IN1 to become an inverted rectangular detection pulse PMR, and since this inverted rectangular detection pulse PMR repeats charging / discharging of the capacitor C via the resistor R7, a delay (a second delay) that is determined by a time constant that, in turn, is determined at the resistor R7 and the capacitor C is applied to the inverted rectangular detection pulse PMR which is then input to the inverter IN2 as a second delay pulse indicated as PLR2 in FIG. 5. Then, the second delay pulse PLR2 is inverted to become a timing setting signal PL2 for low speed operation to constitute the output of the inverter IN2 which is then input to the non-inversion input terminal of the operational amplifier OP4.

Then, at the operational amplifier OP4, the timing setting signal PL2 for low speed operation is compared with the third reference voltage Vt, which is input to the inversion input terminal of the operational amplifier OP4 and, having been delayed by t2 relative to the timing switching signal PMH for high speed operation, is output to the three-phase logic circuit 11 as a timing switching signal PML for low speed operation.

Figure 6:
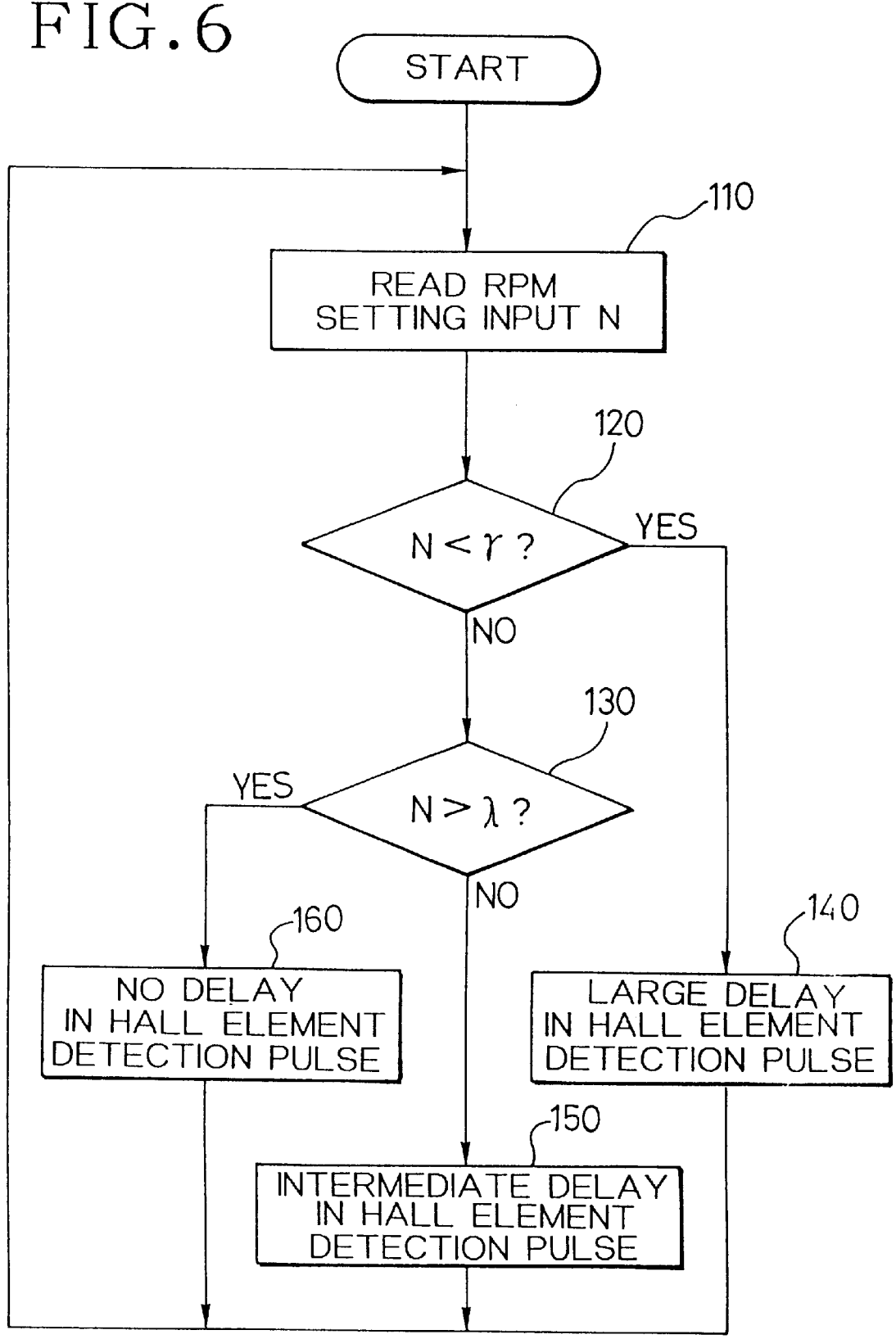
FIG. 6 is a flowchart of the control implemented in the embodiment of the present invention.

Furthermore, if an operation similar to that performed in the circuit described above is to be achieved by a microcomputer, control such as that illustrated in the flow-chart in FIG. 6 may be implemented.

In this control, first, the rotation rate setting input N is read in step 1 10. Then, this rotation rate setting input N is compared with a specific value $\gamma$ and a specific value $\lambda$($\lambda$>$\gamma$) in steps 120 and 130 respectively. If it is decided that the rotation rate setting input N is smaller than the specific value $\gamma$, it is determined that the rotation rate setting is at low speed. Thus, the operation proceeds to step 140 to set the quantity of delay for the Hall element detection pulse to large.

If the rotation rate setting input N is larger than the specific value $\gamma$, it is then compared against the specific value $\lambda$, in step 130. If it is decided in the decision making performed in step 130, that the rotation rate setting input N is smaller than the specific value $\lambda$, it is determined that the rotation rate setting input N is at medium speed, and the operation proceeds to step 150 to set the quantity of delay for the Hall element detection pulse to medium.

If it is decided in the decision making performed in step 130, that the rotation rate setting input N is larger than the specific value $\lambda$, it is determined that the rotation rate setting input N is set at high speed, and the operation proceeds to step 160, in which no delay quantity is set for the Hall element detection pulse.

As has been explained, according to the present invention, since the timing with which the means for switching performs switching is retarded if the signal corresponding to the rotation rate has a value equal to or smaller than the specific value relative to the timing used when the value of the signal is larger than the specific value, the switching timing can be set to the timing at which optimal output efficiency is achieved in the high speed rotation range and to the timing at which noise reduction is achieved in the low speed rotation range.

In addition, it becomes possible to perform finer control as required to achieve an optimal balance between maintaining good output efficiency and achieving noise reduction by continuously changing the timing with which the means for switching performs switching in correspondence to the signal corresponding to the rotation rate or, if switching is to be implemented in steps, by increasing the number of switching steps.

What is claimed is:

1. A drive control apparatus for a brushless motor comprising
   a rotating shaft that passes through said stator rotatably,
   a rotor secured to said rotating shaft, that is provided with permanent magnets facing opposite said stator,
   exciting coils wound around said stator, that generate a rotating magnetic field for said rotor, and
   Hall elements that detect a position of said rotor,
   said drive control apparatus comprising:
      a means for switching that switches among said exciting coils to which an electric current is supplied;
      a means for timing control that controls timing with which said means for switching performs switching based upon an output signal of said Hall elements;
      a means for decision making that makes a decision as to whether or not the value of a signal corresponding to a rotation rate is smaller than a specific value; and
      a means for timing change that, when said signal corresponding to said rotation rate is determined to have a value smaller than said specific value by said means for decision making, retards said timing with which said means for switching performs switching relative to the timing used when said signal corresponding to said rotation rate is determined to have a value larger than said specific value.

2. A drive control apparatus for a brushless motor, according to claim 1, wherein:
   a first decision-making value and a second decision-making value which is smaller than said first decision-making value are provided at said means for decision making, no delay is applied to said timing with which said means for switching performs switching if said signal corresponding to said rotation rate is larger than said first decision-making value, said timing with which said means for switching performs switching is delayed by a first quantity if said signal corresponding to said rotation rate has a value between said first decision-making value and said second decision-making value and said timing with which said means for switching performs switching is delayed by a second quantity which is larger than said first quantity if said signal corresponding to said rotation rate has a value smaller than said second decision-making value.

3. A drive control apparatus for a brushless motor, according to claim 1, wherein:

a delay in said timing with which said means for switching performs switching is caused to change continuously in correspondence to change that said signal corresponding to said rotation rate undergoes.

4. A drive control apparatus for a brushless motor, according to claim 1, wherein:

a delay in said timing with which said means for switching performs switching is caused to change in steps in correspondence to change that said signal corresponding to said rotation rate undergoes.

5. A drive control apparatus for a brushless motor, according to claim 1, wherein:

a delay in said timing with which said means for switching performs switching is achieved by delaying an output signal from said Hall elements at an integrating circuit.

6. A drive control apparatus for a brushless motor, according to claim 1, wherein:

a delay in said timing with which said means for switching performs switching is achieved by inputting said signal corresponding to said rotation rate to a microcomputer, making a decision as to whether or not said signal corresponding to said rotation rate has a value smaller than a specific value, calculating a quantity of delay for an output signal from said Hall elements in correspondence to results of decision making thus performed and setting a quantity of delay to be used when said signal corresponding to said rotation rate is determined to have a value smaller than said specific value larger than a quantity of delay used when said signal corresponding to said rotation rate is determined to have a value larger than said specific value.

7. A drive control apparatus for a brushless motor, according to claim 1, wherein:

said signal corresponding to said rotation rate is a setting signal for setting a rotation rate.

8. A drive control apparatus for a brushless motor, according to claim 1, wherein:

said signal corresponding to said rotation rate is an output signal from a means for detection that detects a rotation rate of said rotor.

9. A drive control apparatus for a brushless motor, according to claim 2, wherein:

a delay in said timing with which said means for switching performs switching is caused to change continuously in correspondence to change that said signal corresponding to said rotation rate undergoes.

10. A drive control apparatus for a brushless motor, according to claim 9, wherein:

said signal corresponding to said rotation rate is a setting signal for setting a rotation rate.

11. A drive control apparatus for a brushless motor, according to claim 9, wherein:

said signal corresponding to said rotation rate is an output signal from a means for detection that detects a rotation rate of said rotor.

12. A drive control apparatus for a brushless motor, according to claim 2, wherein:

a delay in said timing with which said means for switching performs switching is caused to change in steps in correspondence to change that said signal corresponding to said rotation rate undergoes.

13. A drive control apparatus for a brushless motor, according to claim 12, wherein:

said signal corresponding to said rotation rate is a setting signal for setting a rotation rate.

14. A drive control apparatus for a brushless motor, according to claim 12, wherein:

said signal corresponding to said rotation rate is an output signal from a means for detection that detects a rotation rate of said rotor.

15. A drive control apparatus for a brushless motor, according to claim 2, wherein:

a delay in said timing with which said means for switching performs switching is achieved by delaying an output signal from said Hall elements at an integrating circuit.

16. A drive control apparatus for a brushless motor, according to claim 15, wherein:

said signal corresponding to said rotation rate is a setting signal for setting a rotation rate.

17. A drive control apparatus for a brushless motor, according to claim 15, wherein:

said signal corresponding to said rotation rate is an output signal from a means for detection that detects a rotation rate of said rotor.

18. A drive control apparatus for a brushless motor, according to claim 2, wherein:

a delay in said timing with which said means for switching performs switching is achieved by inputting said signal corresponding to said rotation rate to a microcomputer, making a decision as to whether or not said signal corresponding to said rotation rate has a value smaller than a specific value, calculating a quantity of delay for an output signal from said Hall elements in correspondence to results of decision making thus performed and setting a quantity of delay to be used when said signal corresponding to said rotation rate is determined to have a value smaller than said specific value larger than a quantity of delay used when said signal corresponding to said rotation rate is determined to have a value larger than said specific value.

19. A drive control apparatus for a brushless motor, according to claim 18, wherein:

said signal corresponding to said rotation rate is a setting signal for setting a rotation rate.

20. A drive control apparatus for a brushless motor, according to claim 18, wherein:

said signal corresponding to said rotation rate is an output signal from a means for detection that detects a rotation rate of said rotor.

* * * * *